April 10, 1928.                     1,665,973
S. F. NEWMAN
DIE HEAD
Filed July 11, 1925          2 Sheets-Sheet 1
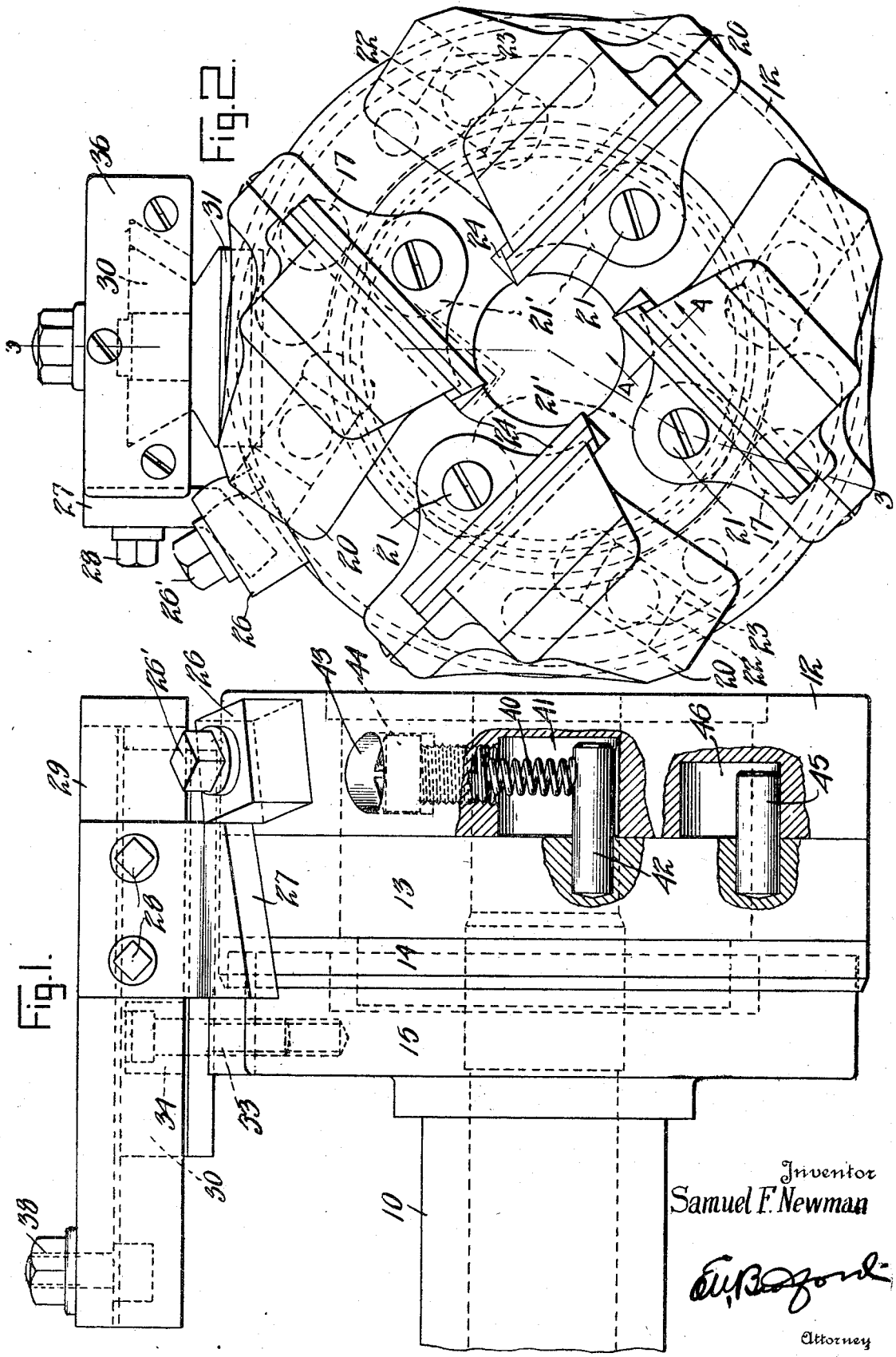
Inventor
Samuel F. Newman
Attorney

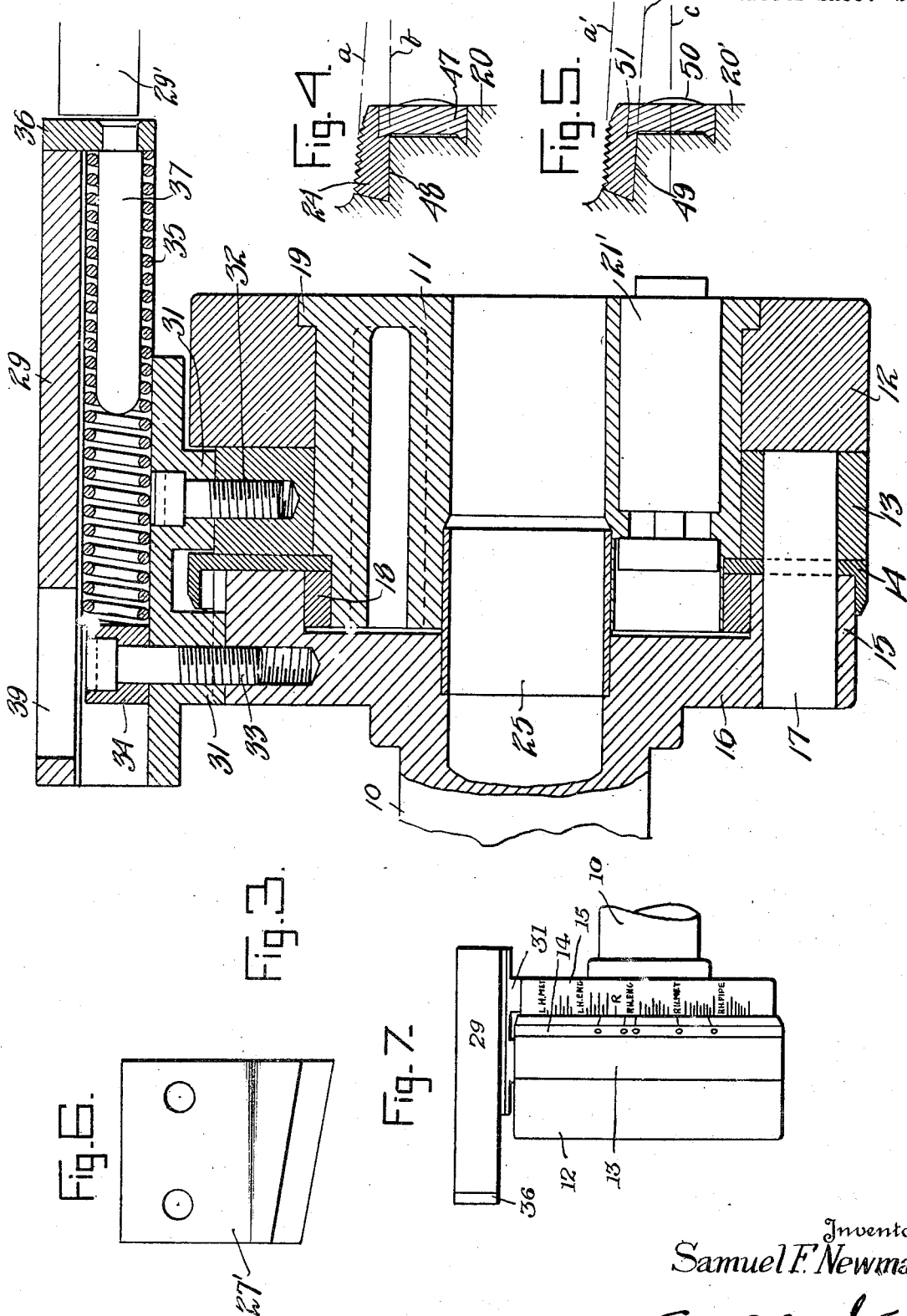

Patented Apr. 10, 1928.

1,665,973

UNITED STATES PATENT OFFICE.

SAMUEL F. NEWMAN, OF WAYNESBORO, PENNSYLVANIA, ASSIGNOR TO LANDIS MACHINE COMPANY, OF WAYNESBORO, PENNSYLVANIA, A CORPORATION OF PENNSYLVANIA.

DIE HEAD.

Application filed July 11, 1925. Serial No. 43,025.

My said invention relates to a die head and it is an object thereof to provide an improved mechanism designed particularly for cutting tapered threads whereby a tapered thread of any desired length may be formed in a single operation.

A further object of the invention is to provide for cutting improved tapered threads which do not have the usual "high spots" where the chasers let go. In constructions, such as have heretofore been in use with Landis tangential chasers for cutting tapered threads "high spots" or ridges have been left on the work when the die head was opened, such ridges conforming in number to the number of chasers employed. The "high spots" or ridges are due to the absence of means for actuating the chasers in and out to conform to the taper, the chasers heretofore being made as wide as the length of the tapered section to be threaded, and the "high spots" or ridges correspondingly extending the full length of such tapered section. In the present construction the teeth or ridges are not cutting throughout their entire length when they let go, but only on the throat or front of the die.

Referring to the accompanying drawings which are made a part hereof and on which similar reference characters indicate similar parts, Figure 1 is a side elevation of my improved device, Figure 2, an end elevation thereof, Figure 3, a longitudinal section on line 3—3 of Fig. 2 with certain parts omitted, Figure 4, a section of one form of chaser with an appropriate holder, Figure 5, a section of a different chaser and its appropriate holder, Figure 6, a modified cam for use on the head, and Figure 7, an elevation showing the opposite side of the head.

In the drawings reference character 10 indicates a shank by means of which the head body 11 is supported. A ring frame surrounds the head body of said ring frame comprising rings 12, 13 and 14 and an annular flange 15 connected to the shank 10 by a radial flange 16 on said shank. The ring 13 is connected to the head body, preferably in a manner to permit rotary adjustment relatively thereto, as by means of a worm seated in the ring 13 and having engagement with worm teeth on the head body. Rotation of the worm turns the head body inside the rings 12, 13 and the flange 15 and so changes the diametrical positions of the chasers and therefore the size of the opening in the head in a manner well-known to those skilled in the art as shown for example in the patents to Landis, 1,018,393, or Miller, 1,296,546. The ring 13 is secured to the flange 15 by pins 17 which prevent the ring from turning relatively to the shank. Ring 12 is held against turning by a cam 27 hereinafter described. The ring 14 carries one or more scale marks cooperating with marks on the flange 15 to indicate the relative angular positions of the head body and the ring 13 thus indicating the adjustment of the chasers. Ring 14 is fixed to the head body for axial movement therewith, a collar 18 (Fig. 3) being secured to the head body for this purpose in any suitable manner. Suitable means (not shown) are also provided whereby the ring 14 is secured to the head body to rotate therewith in adjusting the chasers. This ring 18 serves to hold the rings 12, 13 and 14 against movement in one direction lengthwise of the head body while a flange at 19 holds them against movement in the opposite direction, said ring 18 and flange also preventing any separation of rings 12, 13 and 14.

The head body is provided with chaser holders 20 pivotally secured thereto by screws 21 engaging trunnions 21' on the head body. The chaser holders are also pivotally secured to the ring 12 by means of pins 22 on the ring and blocks 23 slidably mounted in slots in the chaser holders whereby the movement of the ring 12 about the head body moves the holders and therefore the cutting edges of the chasers along arcuate paths toward and from the axis of the head for opening and closing the head, different positions of the chasers being illustrated in Figure 2 in dotted lines. The chasers, as will be evident to those skilled in the art, are of the Landis tangential type being adjustable along the faces of the chaser holders or tangentially of the work and operating tangentially of the work. The internal joint between the head body and the flange 16 is closed by a sleeve 25.

The head body is not locked in a fixed predetermined closed position in the ordinary manner but is adapted to open or close gradually. For the purpose of opening or closing the head gradually the ring 12 is provided with an abutment in the form of a block 26 here shown as secured to the ring by a screw 26'. A cam 27 cooperates with the abutment 26 and this cam is secured by screws 28 or any other convenient means to a slider 29 mounted for movement longitudinally of the head on a track 30 secured to shank 15 and ring 13.

The track is here shown as consisting of a bar or block in the form of a double trapezoid in end elevation with the shorter of the parallel sides engaging one another and with foot portions 31 having flattened faces for engagement with similar faces on flange 15 and ring 13, to which they are secured by screws 32 and 33, the latter screw serving also to secure in place a block 34 against which a spring 35 bears at one end. The spring bears at its other end against a separable front portion 36 of the slider carrying a guide 37 for the spring. It will be evident that the spring tends to force the slider into its extreme forward position as illustrated in Figure 3.

The movement of the slider under the impulse of the spring may be limited by a bolt 38 having a square head shown in dotted lines (Figure 1) projecting into the space at the rear side of the block 34, said bolt being adjustably secured in the slot 39 (Fig. 3) of the slider. It will be seen from the foregoing that the position of the slider relatively to abutment 26 determines the length of the thread to be cut, the slider acting through the cam 27 and the abutment 26 to hold the movable parts of the head in any desired closed position, thus doing away with the necessity of any other means for locking the head closed. In effect the cam 27 and the abutment 26 are the locking means of the head. A fixed abutment 29' may be located in front of the slider if the head moves lengthwise relatively to the work or the abutment may be arranged to move with the work if the head is stationary, said abutment engaging the forward end of the slider and moving it lengthwise of the head whereby the ring 12 is permitted to turn under the action of a spring 40 for gradually opening the head to cut a taper of increasing size. The spring 40 is located in a recess 41 in the closing ring 12 which recess may be approximately tangential to the head body and open at the rear side said spring bearing at one end against a pin 42 on ring 13 which pin extends into said recess. At its other end the spring extends into a smaller recess 43 opening out through the outer peripheral face of ring 12. Recess 43 is closed by a threaded hollow plug 44 which receives the outer end of the spring 40, and by means of which the tension of the spring may be adjusted. Other resilient opening devices may of course be substituted for spring 40 and this feature in general may be embodied in various forms.

A pin 45 on ring 13 enters a recess 46 on ring 12 and serves to limit the relative rotation of said parts by engagement with a wall of said recess. This pin and recess are shown for convenience of illustration as being close to the recess 41, but obviously may be at the opposite side of the head or at an intermediate point. A cam tapered in the reverse sense from that shown at 27 in Figure 1 is shown at 27' in Figure 6 and this may obviously be substituted for that shown in the drawings whereby a taper of decreasing size can be cut with the head illustrated.

In the operation of the device so far described the parts will be in the position illustrated in Figure 3, the chaser being in the position illustrated in dotted lines in Figure 2 when the work begins. The die head there illustrated is of a type which is usually stationary, the work rotating and being moved toward the head by means of a traveling carriage carrying the abutment 29'. The relative axial movement of the head and the work causes the abutment 29' to force the slider 29 backward against the action of the spring 35. As a consequence of such movement the cam 27 permits the spring 40 to turn the ring 12 in a clockwise direction for moving the chaser-holders outward and thus increasing the operative size of the thread so as to form a tapered head of increasing diameter. This action continues until the abutment 26 has moved to the end of the cam 27. When it slips off the end of the cam face the ring is permitted to move so far as to take the chasers away from the work thus permitting the work to be readily removed from the die head. The extent of movement of the ring 12 is limited by the pin 45 and if desired this may be so located as to stop the cam face 27. The operator after removing the work will return the ring to a position where the cam 27 can pass the abutment 26 whereupon the spring 35 will automatically force the slider 29 forward so far as permitted by the bolt 38 which limits the forward movement of the slider except as it may previously strike the abutment 29'.

Figure 4 illustrates in cross section a fragment of a chaser holder 20 and the corresponding chaser 24 secured to the holder by a clamp 47 in a manner familiar to those skilled in the art. The chaser holder has a "straight" face at 48 parallel to the axis of the head. The chaser 24 has a straight face resting on the face 48 and a non-parallel serrated upper face inclined to the axis of the chaser in a manner indicated by the line *a* which is parallel to the upper face of the chaser while the line *b* is parallel to the face 48 of the holder and the corresponding face of the chaser. The cutting edge of the chaser corresponds to the serrated edge in Fig. 4 and is, of course, similarly inclined with reference to the straight face of the chaser in contact with face 48 of the holder, and therefore the cutting edge of each chaser is inclined to the axis of the head for cutting a tapered thread.

In Figure 5 the same result is attained in a different manner, the chaser holder 20′ in this figure having a face at 49 inclined to the axis of the head as indicated by the line *b'*. The serrated outer face of the chaser, which face includes the cutting edge, is parallel to the face 49 and to the adjacent under face of the chaser as indicated by the line *a'* which is parallel to the line *b'*. The line *c* passes through the axis of a clamp screw 50 of ordinary type, said axis as usual being parallel to the axis of the head or out of parallelism with lines *a'* and *b'*. The face at 51 between the upper side face of the clamp and the undercut part of the under side of the chaser is also parallel to the main upper and lower faces of the chaser.

One advantage of the above construction resides in the fact that the length of taper is limited only by the length of relative movement given to the slider and the cam, whereas in previous constructions it was necessary to make chasers of the entire width of the taper intended to be cut. As above stated, the conspicuous high spots hitherto formed at the take-off are not found in the present construction, the high spots of the take-off being only at the throat or front of the die which does all the cutting when this taper attachment is used.

Many other variations may be made in the details of my construction without departing from the spirit of the invention, the true scope of which is indicated in the appended claims, and therefore I do not limit myself to what is shown in the drawings and described in the specification.

Having thus fully described my said invention, what I claim as new and desire to secure by Letters Patent is:—

1. In a die head, a shank, a head body, chasers on the body, an oscillatory ring on the body for moving said chasers into and out of operative position, an abutment on the ring, a cam having linear movement in fixed relation to the die head, said abutment and cam having faces contacting throughout a cutting operation to determine the operative size of the die head, a guide fixed to the shank of the die head, a support for the cam mounted on said guide, and a second abutment having movement relatively to said support in a direction parallel to the axis of the head positioned to move the said cam along said guide, substantially as set forth.

2. In a die head, a shank, a head body, chaser-holders pivotally supported on the body, tangential thread cutting chasers on the holders, an oscillatory ring connected to the chaser-holders for moving the chasers into and out of operative position, an outwardly projecting abutment on said ring, a longitudinal guide mounted on one side of the die head, a plunger sliding on the guide parallel to the shank, a cam carried by the plunger to contact with the said abutment, said cam projecting from one side of the plunger so that the front end of the plunger will be free to act as actuator for the cam, substantially as set forth.

3. In a die head, a shank, a head body, chaser-holders pivotally supported on the body, tangential thread cutting chasers on the holders, an oscillatory ring connected to the chaser-holders for moving the chasers into and out of operative position, an outwardly projecting abutment on said ring, a longitudinal guide mounted on one side of the die head, a plunger sliding on the guide parallel to the shank, a cam carried by the plunger to contact with the said abutment, said cam projecting from one side of the plunger, a stop carried by the guide to limit the movement of the plunger to adjust, through the action of the cam, the size of the closed setting of the chasers, substantially as set forth.

4. In a die head, a shank, a head body, chaser-holders pivotally supported on the body, tangential thread cutting chasers on the holders, an oscillatory ring connected to the chaser-holders for moving the chasers into and out of operative position, an outwardly projecting abutment on said ring, a longitudinal guide mounted on one side of the die head, a plunger sliding on the guide parallel to the shank, a cam carried by the plunger to contact with the said abutment, said cam projecting from one side of the plunger, the various longitudinal positions of the cam controlling through the ring the initial setting of the thread chasers for size, their gradual expansion for taper and their total release, substantially as set forth.

In witness whereof, I have hereunto set my hand at Waynesboro, Pennsylvania, this 8th day of July, A. D. nineteen hundred and twenty-five.

SAMUEL F. NEWMAN.